United States Patent
Bahouth

Patent Number: 5,673,094
Date of Patent: Sep. 30, 1997

[54] EYEGLASS FLOTATION ASSEMBLY

[76] Inventor: Donald G. Bahouth, 1052 McNeil Ave., Mobile, Ala. 36609

[21] Appl. No.: 571,388

[22] Filed: Dec. 13, 1995

[51] Int. Cl.$^6$ .............................. G02C 1/00; G02C 5/00
[52] U.S. Cl. ................................. 351/43; 351/148
[58] Field of Search ............................. 351/41, 43, 142, 351/148, 152, 158, 157

[56] References Cited

U.S. PATENT DOCUMENTS

| | | | |
|---|---|---|---|
| 4,541,696 | 9/1985 | Winger et al. | 351/123 |
| 5,015,085 | 5/1991 | May | 351/41 |
| 5,191,363 | 3/1993 | Smith et al. | 351/43 |
| 5,235,355 | 8/1993 | May | 351/123 |
| 5,369,452 | 11/1994 | Williams | 351/157 |
| 5,488,441 | 1/1996 | Pomatti | 351/43 |

*Primary Examiner*—Huy Mai
*Attorney, Agent, or Firm*—Joseph N. Breaux

[57] ABSTRACT

An eyeglass flotation assembly including a first and second resilient ear piece connector each having a curved orifice for resiliently receiving the curved end portion of an eyeglass ear piece; and a strap member secured between the first and second ear piece connectors. The ear piece connectors are constructed from a buoyant material, preferably a plastic foam. In various embodiments the strap member may include an inflatable bladder member housed within a fabric sheath; one of the ear piece connectors may include an inflation mechanism for inflating the bladder member; the other ear connector may includes a valve for adjusting the buoyancy level of the assembly by adjusting the amount of air contained within the bladder member; and the strap member may be equipped with an adjustment slide.

18 Claims, 2 Drawing Sheets

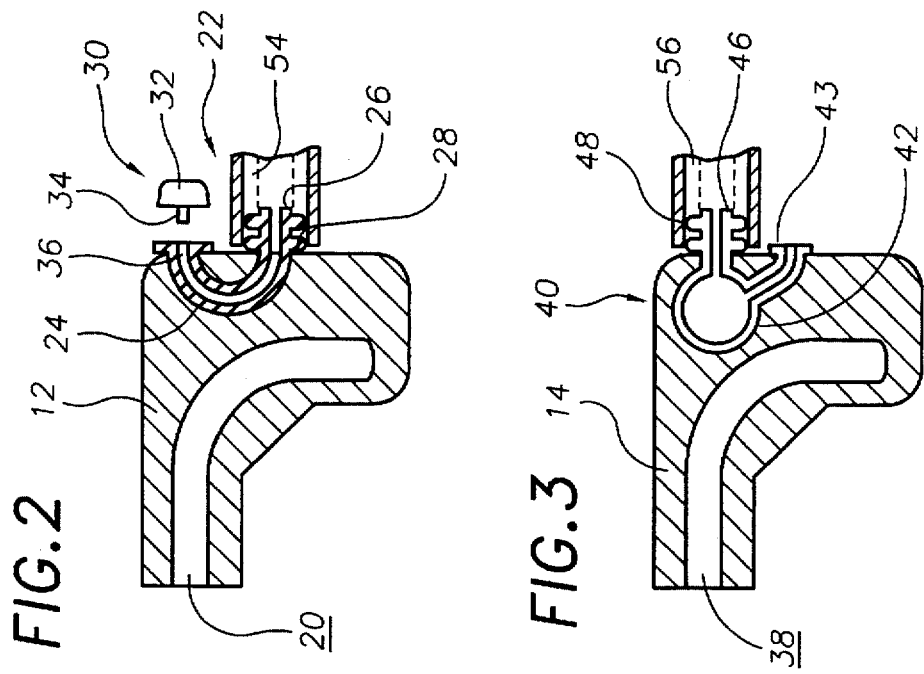
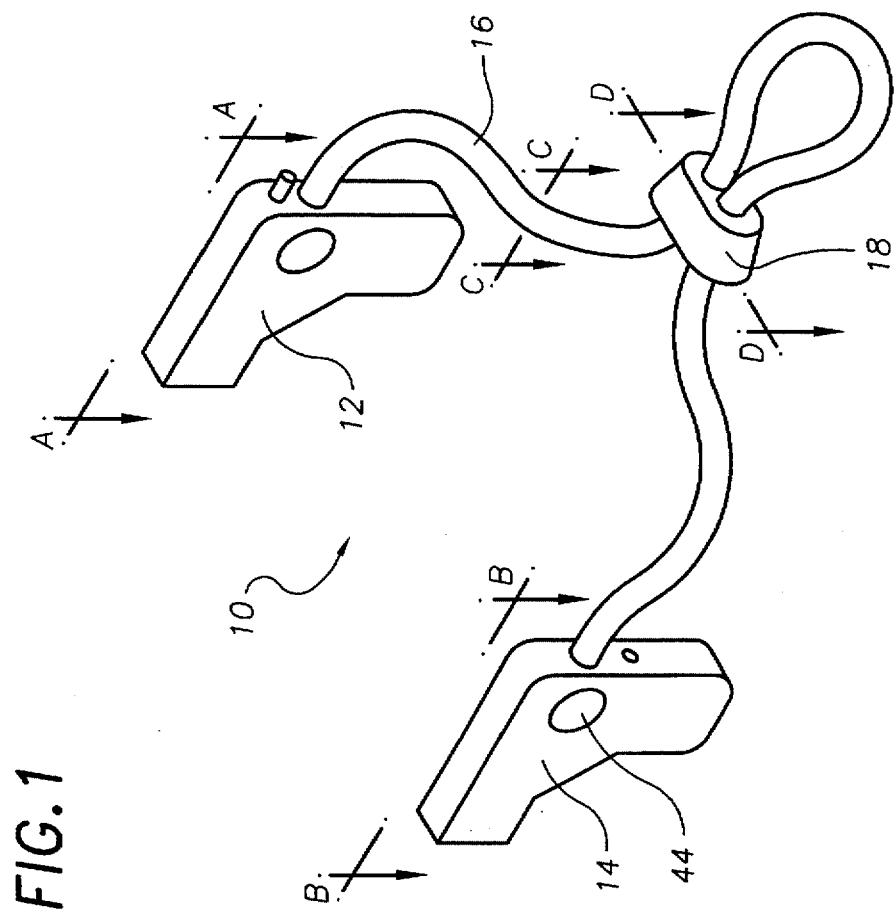

5,673,094

EYEGLASS FLOTATION ASSEMBLY

TECHNICAL FIELD

The present invention relates to devices that are securable to an item to increase the buoyancy of the item in water and more particularly to devices that are securable to the ear pieces of a pair of eyeglasses to increase the buoyancy of the eyeglasses sufficiently to keep the eyeglasses afloat at or near the surface of a body of water.

BACKGROUND ART

Eyeglasses are often lost when engaging in boating or other activities around bodies of water. The loss generally occurs when the glasses fall into muddy, deep or rapidly flowing water. Because eyeglasses are not generally buoyant, once the glasses are dropped, the glasses rapidly sink beneath the surface never to be seen again. It would be a benefit, therefore, to have a device that was securable to the eyeglasses that increased the buoyancy of the eyeglasses sufficiently to keep the eyeglasses floating at or just below the surface of the water so that the eyeglasses could be retrieved. It would also be desirable if the device included a mechanism for securing the glasses to the head and neck of the user in an effort to prevent dropping altogether. In addition, because eyeglass wearers often wear glasses while swimming it would be desirable if the buoyancy of the device was adjustable to a level that just supported the eyeglasses near the surface but that did not increase the buoyancy to a level sufficient to buoyantly pull the glasses from the face of a submerged swimmer.

GENERAL SUMMARY DISCUSSION OF INVENTION

It is thus an object of the invention to provide an eyeglass flotation assembly that is securable to a pair of eyeglasses in a manner to increase the buoyancy of the eyeglasses sufficiently to keep the eyeglasses floating at or just below the surface of the water.

It is a further object of the invention to provide an eyeglass flotation assembly that includes a mechanism for securing the glasses to the head and neck of the user.

It is a still further object of the invention to provide an eyeglass flotation assembly that includes a mechanism for adjusting the buoyancy of the flotation assembly.

It is a still further object of the invention to provide an eyeglass flotation assembly that accomplishes all or some of the above objects in combination.

Accordingly, an eyeglass flotation assembly is provided. The eyeglass flotation assembly includes a first and second resilient ear piece connector each having a curved orifice for resiliently receiving the curved end portion of an eyeglass ear piece; and a strap member secured between the first and second ear piece connectors. The ear piece connectors are constructed from a buoyant material, preferably a plastic foam.

In a preferred embodiment, the strap member includes an inflatable bladder member housed within a fabric sheath. When an inflatable bladder is used, one of the ear piece connectors preferable includes an inflation mechanism for inflating the bladder member, and more preferably includes a pump type mechanism for inflating the bladder mechanism without having to blow into a mouthpiece. The other ear connector preferable includes a valve for adjusting the buoyancy level of the assembly by adjusting the amount of air contained within the bladder member. The strap member may also preferably be equipped with an adjustment slide. The adjustment slide is utilized to adjust the effective length of the strap member between the two ear piece connectors. The term "effective length" is used herein to mean the length of the strap member that is under tensional force when tension is applied between the first and second ear piece connectors.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein:

FIG. 1 is a perspective view of an exemplary embodiment of the eyeglass flotation assembly of the present invention including a first ear piece connector, a second ear piece connector, a strap member, and a strap member adjustment slide.

FIG. 2 is a cross-sectional view of the first ear piece connector along the line A—A of FIG. 1 showing the first bladder connection fitting and the valve mechanism.

FIG. 3 is a cross-sectional view of the second ear piece connector along the line B—B of FIG. 1 showing the second bladder connection fitting-and the pump mechanism.

EXEMPLARY MODE FOR CARRYING OUT THE INVENTION

Figure 4A:
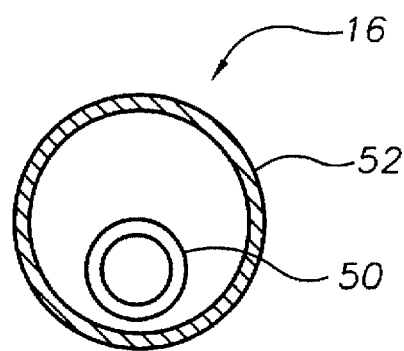
FIG. 4A is a cross-sectional view of the strap member along the line C—C of FIG. 1 showing a deflated bladder member within the fabric sheath.

FIG. 1 shows an exemplary embodiment of the eyeglass flotation assembly of the present invention generally designated by the numeral 10. Flotation assembly 10 includes a first ear piece connector 12, a second ear piece connector 14, an inflatable strap member 16, and a strap member adjustment slide 18. In this embodiment, first and second ear piece connectors 12, 14 are constructed from a buoyant, plastic foam having a brightly colored exterior. Each ear piece connector 12, 14 includes an arcuately shaped, ear piece orifice adapted for resiliently receiving the terminal end of the ear piece of a pair of eyeglasses. The term "resiliently receive" is used herein to mean requiring at least temporary deformation of the shape of the ear piece connector during insertion of the ear piece into the ear piece receiving orifice.

FIG. 2 is a cross-sectional view of first ear piece connector 12 along the line A—A of FIG. 1 showing a first arcuately shaped ear piece receiving orifice 20. In this embodiment, receiving orifice 20 has about a sixty degree bend along the center section thereof. Also show in the figure is a valve assembly, generally referenced by the numeral 22, including a valve housing 24 partially embedded within the foam material of first ear connector 12. A first bladder connection fitting 26 extends outwardly from first ear connector 12 in connection with one end of valve housing 24. Connection fitting 26 includes a pair of circumferential engagement members 28. A screw valve, generally reference by the numeral 30, is provided at the second end of valve housing 24. Screw valve 30 includes a thumb screw 32 having a threaded shaft 34 that engageably seals an internally threaded end portion 36 of valve housing 24.

FIG. 3 is a cross-sectional view of second ear piece connector 14 along the line B—B of FIG. 1 showing a second arcuately shaped ear piece receiving orifice 38. Receiving orifice 38 has a sixty degree bend along the center section thereof in the manner of first receiving orifice 20. Also show in the figure is a pump assembly, generally referenced by the numeral 40, including a pump housing 42 and a one-way intake valve 43 that are partially embedded within the foam material of second ear connector 14. With reference to FIG. 1, pump housing 42 includes an exteriorly positioned bulb portion 44 that is depressed to force air through (with reference once again to FIG. 3) a second bladder connection fitting 46 that is in connection with pump housing 42 and that extends outwardly from second ear connector 14. Connection fitting 46 also includes a pair of circumferential engagement members 48.

Figure 4B:
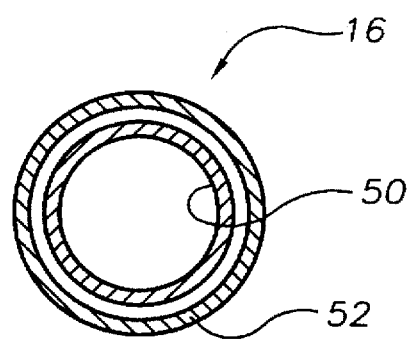
FIG. 4B is a cross-sectional view of the strap member along the line C—C of FIG. 1 showing an inflated bladder member within the fabric sheath.

FIG. 4A is a cross-sectional view of strap member 16 along the line C—C of FIG. 1 showing a deflated bladder member 50 within a fabric outer sheath 52. Outer sheath 52 is a length of woven nylon tubing. Bladder member 50 is a length of thin walled, expandable tubing constructed from a balloon type rubber material. A first end 54 (shown in FIG. 2) of bladder member 50 is stretched over first bladder member connecting fitting 26 and sealingly held in place by engagement members 28 and a quantity of adhesive. A second end 56 (shown in FIG. 3) of bladder member 50 is stretched over second bladder member connecting fitting 46 and sealingly held in place by engagement members 48 and a quantity of adhesive. FIG. 4B is a cross-sectional view of strap member 16 along the line C—C of FIG. 1 showing bladder member 50 fully inflated within fabric sheath 52.

Figure 5:
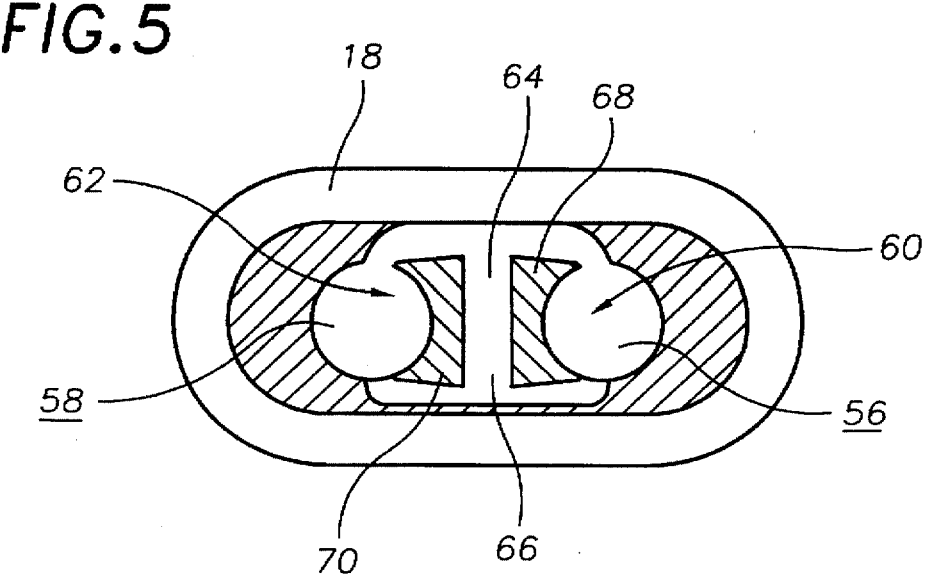
FIG. 5 is a cross-sectional view of the strap member adjustment slide along the line D—D of FIG. 1 showing the interior spring loaded strap gripping mechanisms.

FIG. 5 is a cross-sectional view of strap member adjustment slide 18 along the line D—D of FIG. 1. Adjustment slide 18 has first and second parallel strap bores 56, 58. Each strap bore 56, 58 includes a spring loaded strap grip mechanism, 60, 62, respectively, that includes a spring 64, 66 and a gripper member 68, 70. Springs 64, 66 bias gripper members 68, 70 in a direction that reduces the size of each strap bore 56, 58 sufficiently to allow gripper members 68, 70 to firmly grip a section of strap member 16 without eliminating air flow between first connecting member 12 and second connecting member 14 through bladder member 50.

Use of eyeglass flotation assembly 10 is now described with general reference to FIGS. 1-5. Flotation assembly 10 is secured to a pair of glasses by inserting a first or second ear piece connectors 12, 14 over each ear piece of the eyeglasses. This is accomplished by inserting the end of the eyeglass earpiece into the earpiece receiving orifice 20, 38 and deforming the earpiece connector 12, 14 until the end of the earpiece is positioned within an ear piece receiving orifice 20, 38. The effective length of strap member 16 is then adjusted by grasping strap adjustment slide 18 and positioning it along strap member 16 until a desired effective length is achieved. Screw valve 30 is then closed by tightening thumb screw 32 within internally threaded end portion 36 of valve housing 24. Air is then forced into bladder member 50 by depressing and releasing the bulb portion 44 of pump assembly 40 until bladder member 50 is fully inflated. If desired, the buoyancy of the combined eyeglasses and flotation assembly 10 may be adjusted by venting small quantities of air from bladder member 50 through screw valve 30.

It can be seen from the preceding description that an eyeglass flotation assembly has been provided that is securable to a pair of eyeglasses in a manner to increase the buoyancy of the eyeglasses sufficiently to keep the eyeglasses floating at or just below the surface of the water; that includes a mechanism for securing the glasses to the head and neck of the user; and that includes a mechanism for adjusting the buoyancy of the flotation assembly.

It is noted that the embodiment of the eyeglass flotation assembly described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. An eyeglass flotation assembly comprising:

a first and second resilient, buoyant, ear piece connector, each said ear piece connector having a curved orifice formed therein for resiliently receiving a curved end portion of an eyeglass ear piece; and a strap member secured between said first and second ear piece connectors;

said strap member including an inflatable bladder member housed within a fabric sheath.

2. The eyeglass flotation assembly of claim 1, wherein:

one of said ear piece connectors includes an inflation mechanism for inflating said bladder member.

3. The eyeglass flotation assembly of claim 2 wherein:

said inflation mechanism is a pump type mechanism.

4. The eyeglass flotation assembly of claim 2 wherein:

one of said ear connectors includes a valve in connection with said bladder member in a manner to allow a user to adjust the amount of air contained within said bladder member.

5. The eyeglass flotation assembly of claim 4 wherein:

said valve includes a threaded plug member sealingly threadable into an internally threaded end portion of a valve housing.

6. The eyeglass flotation assembly of claim 5 wherein:

said inflation mechanism is a pump type mechanism.

7. The eyeglass flotation assembly of claim 4 wherein:

said inflation mechanism is a pump type mechanism.

8. The eyeglass flotation assembly of claim 1 wherein:

one of said ear connectors includes a valve in connection with said bladder member in a manner to allow a user to adjust the amount of air contained within said bladder member.

9. The eyeglass flotation assembly of claim 8 wherein:

said valve includes a threaded plug member sealingly threadable into an internally threaded end portion of a valve housing.

10. The eyeglass flotation assembly of claim 1 further including:

an adjustment member slidably connectable with said strap member in a manner to allow a user to adjust an effective length of said strap member.

11. The eyeglass flotation assembly of claim 10, wherein:

one of said ear piece connectors includes an inflation mechanism for inflating said bladder member.

12. The eyeglass flotation assembly of claim 11 wherein:

one of said ear connectors includes a valve in connection with said bladder member in a manner to allow a user to adjust the amount of air contained within said bladder member.

13. The eyeglass flotation assembly of claim 12 wherein: said inflation mechanism is a pump type mechanism.

14. The eyeglass flotation assembly of claim 10 wherein: said adjustment member has first and second parallel strap bores, and each strap bore includes a spring loaded strap grip mechanism having a spring and a gripper member.

15. The eyeglass flotation assembly of claim 14, wherein: one of said ear piece connectors includes an inflation mechanism for inflating said bladder member.

16. The eyeglass flotation assembly of claim 15 wherein: said inflation mechanism is a pump type mechanism.

17. The eyeglass flotation assembly of claim 10 wherein: one of said ear connectors includes a valve in connection with said bladder member in a manner to allow a user to adjust the amount of air contained within said bladder member.

18. An eyeglass flotation assembly comprising:

a first and second resilient, buoyant, ear piece connector, each said ear piece connector having a curved orifice formed therein for resiliently receiving a curved end portion of an eyeglass ear piece;

a valve assembly including a valve housing partially embedded within the first ear connector and a first bladder connection fitting extending outwardly from the first ear connector, the first bladder connector fitting having a pair of circumferential engagements members extending outwardly therefrom;

a pump assembly including a pump housing and a one-way intake valve that are partially embedded within said second ear connector, said pump housing including a bulb portion positioned exteriorly of said second ear connector and a second bladder connection fitting having a pair of second circumferential engagement members;

a strap member secured between said first and second ear piece connectors, said strap member including an inflatable bladder member constructed from a length of thin walled, expandable tubing housed within a tubular shaped woven fabric sheath, said bladder member having a first end stretched over and surrounding said first bladder connection fitting and a second end stretched over and surrounding said second bladder connection fitting;

said bladder member being inflatable to fill said woven sheath by operation of said pump assembly when said valve assembly is closed, and deflatable when inflated by opening said valve assembly.

* * * * *